(12) United States Patent
Lee (10) Patent No.: US 8,719,931 B2
(45) Date of Patent: May 6, 2014

(54) ANTI-MALWARE SCANNING SYSTEM AND METHOD THEREOF

(75) Inventor: KangKyu Lee, Yongin-si (KR)

(73) Assignee: Samsung SDS Co., Ltd., Seoul (KR)

( * ) Notice: Subject to any disclaimer, the term of this patent is extended or adjusted under 35 U.S.C. 154(b) by 95 days.

(21) Appl. No.: 13/307,729

(22) Filed: Nov. 30, 2011

(65) Prior Publication Data

US 2012/0137365 A1 May 31, 2012

(30) Foreign Application Priority Data

Nov. 30, 2010 (KR) ........................ 10-2010-0120269

(51) Int. Cl.
*G06F 12/14* (2006.01)
*G06F 11/36* (2006.01)

(52) U.S. Cl.
USPC .................................. 726/22; 726/26; 726/34

(58) Field of Classification Search
None
See application file for complete search history.

(56) References Cited

U.S. PATENT DOCUMENTS

| 2006/0161984 | A1 | 7/2006 | Phillips et al. |
| 2006/0284632 | A1 | 12/2006 | Braverman et al. |
| 2008/0201375 | A1* | 8/2008 | Khedouri et al. ......... 707/104.1 |
| 2009/0100055 | A1 | 4/2009 | Wang |
| 2010/0313271 | A1* | 12/2010 | Johnson et al. ................. 726/24 |

FOREIGN PATENT DOCUMENTS

| JP | 08-179942 A | 7/1996 |
| JP | 09-319574 A | 12/1997 |
| JP | 2004-528651 A | 9/2004 |
| JP | 2005-11012 A | 1/2005 |
| JP | 2006-319788 A | 11/2006 |
| JP | 2009223908 A | 10/2009 |
| WO | 02/086717 A1 | 10/2002 |
| WO | 02086717 A1 | 10/2002 |
| WO | 2007/026423 A1 | 3/2007 |

OTHER PUBLICATIONS

Method and Apparatus for Security Isolation Devices. IBM. Jun. 21, 2009.*
Secure Downloads. IBM. Mar. 5, 2011.*
Method for Creating Task-Specific Virtual Machines to Test Malicious Code. IBM. Feb. 5, 20009.*
A Computational Forsenic Methodology for Malicious Application Detection on Android OS. Voronkova. Mar. 20111.*
Communication dated Aug. 31, 2012 issued by the Korean Patent Office in counterpart Korean Patent Application No. 10-2010-0120269.
Communication dated Mar. 2, 2012, issued by the European Patent Office in counterpart European Application No. 11191326.5.
Communication from the Japanese Patent Office dated May 17, 2013, in a counterpart application No. 2011-260825.

* cited by examiner

*Primary Examiner* — Venkat Perungavoor
(74) *Attorney, Agent, or Firm* — Sughrue Mion, PLLC (57) ABSTRACT

Provided are an anti-malware scanning system and a method thereof. The system includes: a host; and a chip which is removably connected to the host, receives a file to be scanned from the host, and scans whether malware exists in the file, wherein the host adjusts a size of the file to be scanned to correspond to a storage capacity of a storage unit of the chip and transmits the adjusted file to the chip. Accordingly, scanning is performed effectively even in an environment in which resources of the anti-malware scanning system are limited.

18 Claims, 9 Drawing Sheets

ANTI-MALWARE SCANNING SYSTEM AND METHOD THEREOF

CROSS-REFERENCE TO RELATED PATENT APPLICATION

This application claims priority from Korean Patent Application No. 10-2010-0120269, filed on Nov. 30, 2010 in the Korean Intellectual Property Office, the disclosure of which is incorporated herein by reference in its entirety.

BACKGROUND

1. Field

Apparatuses and methods consistent with exemplary embodiments relate to an anti-malware scanning system and a method thereof, and more particularly, to an anti-malware scanning system which can perform scanning effectively even in an environment in which resources to be scanned are limited, and a method thereof.

2. Description of the Related Art

Electronic and/or electric devices (hereinafter, referred to as devices) are utilized for diverse purposes. For example, devices such as personal computers, servers, mobile phones, personal digital assistants (PDAs), or smart phones support additional functions such as financial transactions, Internet shopping, or Internet telephony, besides their original functions. However, these additional functions may be supported through a network in many cases and it is highly likely that the devices are exposed to malicious malware such as viruses during a process of performing the additional functions.

However, despite the fact that resources capable of scanning malware by themselves are limited in the above-described devices, data to be scanned is increasing. Accordingly, there is a demand for a method for scanning malware effectively with limited resources.

SUMMARY

One or more aspects of exemplary embodiments provide an anti-malware scanning system which can perform scanning effectively even in an environment in which resources of an anti-malware system are limited, and a method thereof.

One or more aspects of exemplary embodiments also provide an anti-malware scanning system which can perform scanning effectively even in an environment in which both resources of an anti-malware system realized in the form of a chip and resources of a host having a file to be scanned are limited, and a method thereof.

One or more aspects of exemplary embodiments also provide a recording medium in which a program to perform a method for scanning easily even in an environment in which both resources of an anti-malware system realized in the form of a chip and resources of a host connected to the chip are limited is recorded.

According to an aspect of an exemplary embodiment, there is provided an anti-malware scanning system including: a host; and a chip which is removably connected to the host, receives a file to be scanned from the host, and scans whether malware exists in the file, wherein the host adjusts a size of the file to be scanned to correspond to a storage capacity of a storage unit of the chip and transmits the adjusted file to the chip.

According to an aspect of another exemplary embodiment, there is provided a method for scanning whether malware exists in a file of a host, the method including: if a size of the file to be scanned is larger than a storage capacity of a storage unit of a chip which is removably connected to the host, transmitting a part of the file to be scanned to the chip; and scanning the file received by the chip.

The storage unit may include a volatile storage unit, and a size of the part of the file to be scanned may be smaller than a capacity of the volatile storage unit.

The scanning may include, if the size of the file to be scanned is smaller than a capacity of the volatile storage unit, storing the file to be scanned in the volatile memory, and, if the size of the file to be scanned is larger than the capacity of the volatile storage unit, storing the file to be scanned in the non-volatile storage unit, and scanning by comparing the part of the file stored in the volatile storage unit or the non-volatile storage unit and signature data in sequence.

The method may further include, if the file to be scanned is a compressed file, determining whether it is possible to decompress the file in part; and, if it is possible to decompress the file in part, decompressing the file in part, and the transmitting may include transmitting a part of the file decompressed in part to the chip.

The transmitting may include, if it is impossible to decompress the file in part, decompressing the entire file and transmitting a part of the decompressed entire file.

The method may further include comparing the size of the file to be scanned and the storage capacity of the storage unit of the chip.

According to an aspect of another exemplary embodiment, there is provided a method for scanning whether malware exists in a file of a host, the method including: transmitting the file to be scanned to a chip which is removably connected to the host; and receiving a result of malware scanning from the chip, wherein the transmitting comprises, if a size of the file to be scanned is larger than a storage capacity of a storage unit of the chip, transmitting a part of the file to be scanned to the chip.

According to an aspect of another exemplary embodiment, there is provided a method for scanning whether malware exists in a file of a host, the method including: receiving, by a chip which is removably connected to the host, the file to be scanned from the host; and scanning, by the chip, the received file for malware, wherein the receiving comprises, if a size of the file to be scanned is larger than a storage capacity of a storage unit of the chip, receiving a part of the file to be scanned.

According to an aspect of another exemplary embodiment, there is provided a recording medium in which a computer readable program is recorded and which records a program to execute at least one of the above-described methods.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art. It will be understood that when an element, layer or region is referred to as being "on" another element, layer or region, the element, layer or region can be directly on another element, layer or region or intervening elements, layers or regions.

Also, it will be understood that when a first element (or first component) is referred to as being operated or executed "on" a second element (or second component), the first element (or first component) can be operated or executed in an environment where the second element (second component) is operated or executed or can be operated or executed by interacting with the second element (second component) directly or indirectly. Moreover, it is understood that expressions such as "at least one of," when preceding a list of elements, modify the entire list of elements and do not modify the individual elements of the list.

Also, it will be understood that when an element, component, apparatus or system is referred to as comprising a component consisting of a program or software, the element, component, apparatus or system can comprise hardware (for example, a memory or a central processing unit (CPU)) necessary for executing or operating the program or software or another program or software (for example, a operating system (OS), a driver necessary for driving a hardware), unless the context clearly indicates otherwise.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

Also, it will be understood that an element (or component) can be realized by software, hardware, or software and hardware, unless the context clearly indicates otherwise.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, layers, regions, elements, components, and/or groups thereof, but do not preclude the presence or addition of one or more other features, integers, steps, operations, layers, regions, elements, components, and/or groups thereof. As used herein, the term "and/or" includes any and all combinations of one or more of the associated listed items.

Figure 1:
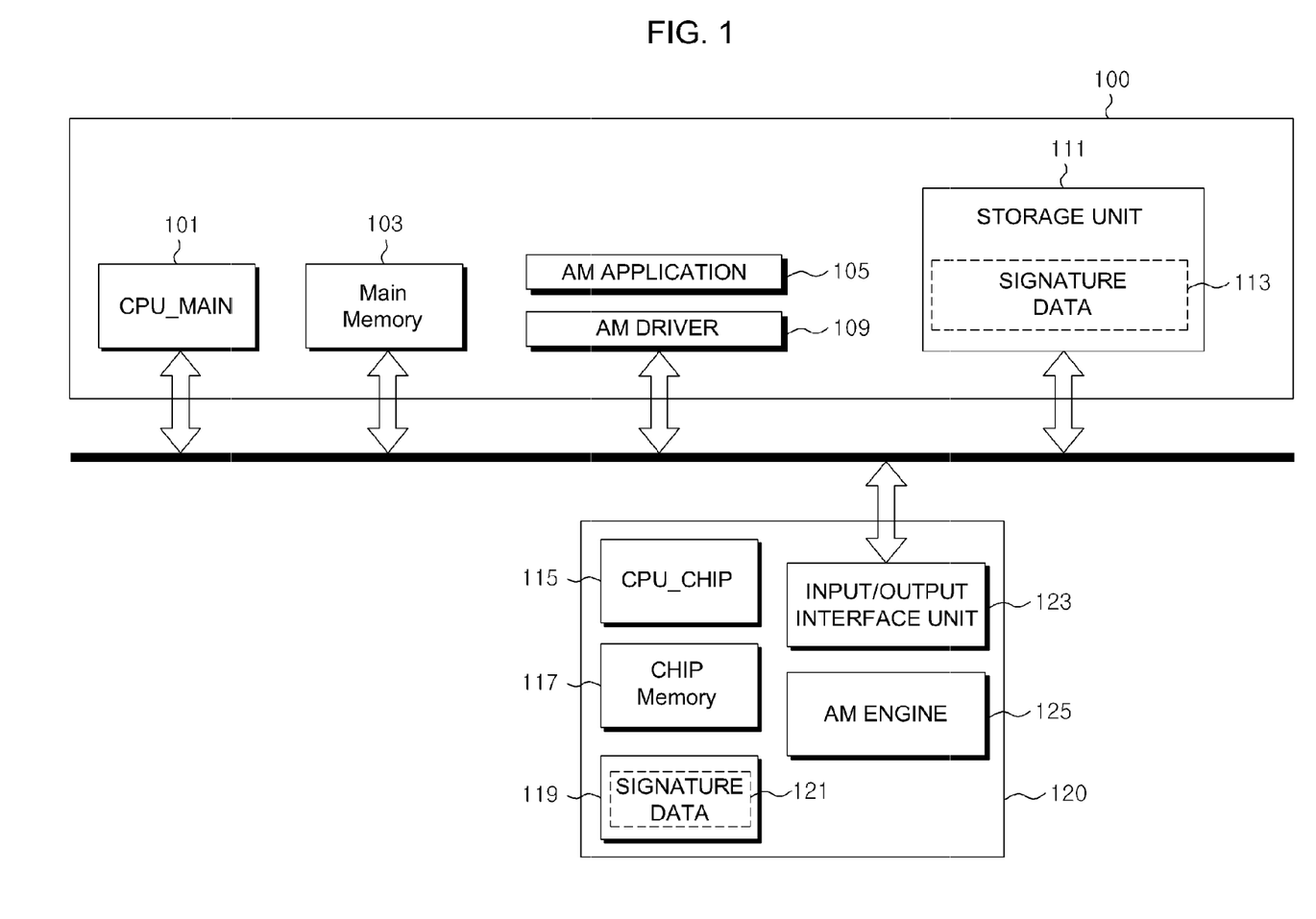
FIG. 1 is a block diagram illustrating an anti-malware scanning system according to an exemplary embodiment.

FIG. 1 is a block diagram illustrating an anti-malware scanning system according to an exemplary embodiment.

Referring to FIG. 1, an anti-malware scanning system according to an exemplary embodiment includes a host 100 and a chip 120. According to an exemplary embodiment, the host 100 and the chip 120 may be mounted on a main board and may be connected to each other. According to an exemplary embodiment, the host 100 may include a central processing unit (hereinafter, referred to as a 'CPU_MAIN') 101, a memory (hereinafter, referred to as a 'main memory') 103, a user interface (UI) application unit (hereinafter, referred to as an 'AM application') 105, an anti-malware driver (hereinafter, referred to as an 'AM driver') 109, and a storage unit 111. The UI application unit 105 may be an anti-malware application (hereinafter, referred to as an 'AM application'). Signature data 113 and 121 may be stored in the storage unit 111 or a storage unit 119 of the chip 120, which will be described below. The UI application unit 105 may be stored in the storage unit 111 or a separate storage unit (not shown) and may be loaded into the main memory 103 for operation.

According an exemplary embodiment, the chip 120 may include a central processing unit (hereinafter, referred to as a 'CPU_CHIP') 115, a memory (hereinafter, referred to as a 'CHIP memory') 117, a storage unit 119, an input/output interface unit 123, and an anti-malware engine (hereinafter, referred to as an 'AM engine') 125. The AM engine 125 may be realized by at least one of hardware and software. In the case that the AM engine 125 is realized by the software, the AM engine 125 may be stored in the storage unit 119 or a separate storage unit (not shown) and may be loaded into the CHIP memory 117 for operation. The CPU_CHIP 115 controls overall operations of the above-described elements of the chip 120.

According to an exemplary embodiment, the chip 120 may be removably (i.e., detachably) mounted on the main board, may be realized in the form of a chip for intellectual property (IP) or in the form of a general chip, and may be configured in the form of a chip to scan malware. The chip 120 may be a smartcard such as a subscriber identity module (SIM), a universal subscriber identity module (USIM), a universal integrated circuit card (UICC), a finance IC chip, etc.

The chip 120 receives data that is used or operated in the host 100 (any arbitrary data including execution files, data, and file) (hereinafter, referred to as a file to be scanned) from the host 100 and scans whether malware exists in the file. The malware includes any arbitrary data that may harm operation of devices including the host 100 and the chip 120.

According to an exemplary embodiment, the chip 120 determines whether the malware exists by comparing the signature data 113 and 121 and the file to be scanned. The file to be scanned may be data that the host 100 owns or stores, or data that the host 100 receives from an external source. The signature data 113 and 121 may be stored in the host 100 or the chip 120. If the signature data 113 and 121 are stored in the host 100, the chip 120 receives the signature data 113 and 121 from the host 100 and performs scanning by comparing the received signature data 113 and 121 and the file to be scanned.

According to an exemplary embodiment, the host 100 may adjust a size of the file to be scanned to correspond to a storage capacity of the chip 120 and transmit the data to the chip 120.

For example, the host 100 compares the size of the file to be scanned and the storage capacity of the chip 120, and, if the size of the file to be scanned is smaller than the storage capacity of the chip 120, the host 100 transmits the file to be scanned to the chip 120 as it is, but, if the size of the file to be scanned is larger than or equal to the storage capacity of the chip 120, the host 100 does not transmit the entire file and transmits a part of the file to the chip 120.

A size of the part of the file to be scanned is determined according to the storage capacity of the chip 120, for example, is determined according to a storage capacity of the CHIP memory 117 of the chip 120. For example, the size of the part of the file to be scanned, which is transmitted from the host 100, may be smaller than the storage capacity of the CHIP memory 117.

According to an exemplary embodiment, if the file to be scanned is a compressed file, the host 100 may decompress the file and may transmit a part or an entirety of the decompressed file to the chip 120. Also, the host 100 may determine whether it is possible to decompress the file in part, and if it is determined that it is possible to decompress the file in part, the host 100 may decompress the file in part and may transmit a part or an entirety of the file that is decompressed in part to the chip 120. On the other hand, if it is determined that it is impossible to decompress the file in part, the host may decompress the entire file and may transmit a part or an entirety of the decompressed entire file to the chip 120.

According to an exemplary embodiment, the host 100 may receive identification of the storage capacity of the chip 120 (for example, a capacity of at least one of the CHIP memory 117 and the storage unit 119) from the chip 120.

According to an exemplary embodiment, if the file to be scanned, which is transmitted from the host 100, is smaller than a capacity of a volatile storage unit (for example, the CHIP memory 117) of the chip 120, the chip 120 may store the file to be scanned in the volatile storage unit, and, if the file to be scanned is larger than the capacity of the volatile storage unit of the chip 120, the chip 120 may store the file in a non-volatile storage unit (for example, the storage unit 119).

Also, in the case that the file to be scanned, which is transmitted from the host 100, is a compressed file, the chip 120 may store the file in the volatile storage unit if the size of the file is smaller than the storage capacity of the volatile storage unit after decompression, and may store the file in the non-volatile storage unit if the size of the file is larger than or equal to the storage capacity of the volatile storage unit after decompression.

The AM application 105 may transmit the file to be scanned to the input/output interface unit 123 through the AM driver 109 and may provide a user interface screen to show a result of scanning for the user or receive a command to scan.

According to an exemplary embodiment, if the command to scan is input by the user through the user interface screen (or, for example, according to a scanning schedule pre-stored in the storage unit 111), the AM application 105 may divide the file to be scanned by a predetermined size and may transmit the divided portions of the file to the input/output interface unit 123 through the AM driver 109. The predetermined size may be determined considering the storage capacity of the chip 120 as described above and may be determined by the AM application 105 or the CPU_MAIN 101.

Alternatively, the chip 120 may determine the size of the file to be scanned since the chip 120 knows its own storage capacity and may inform the host 100 of the size. In this case, the host 100 may transmit the file to be scanned to the chip 120 according to the size of the file transmitted from the chip 120.

Figure 2:
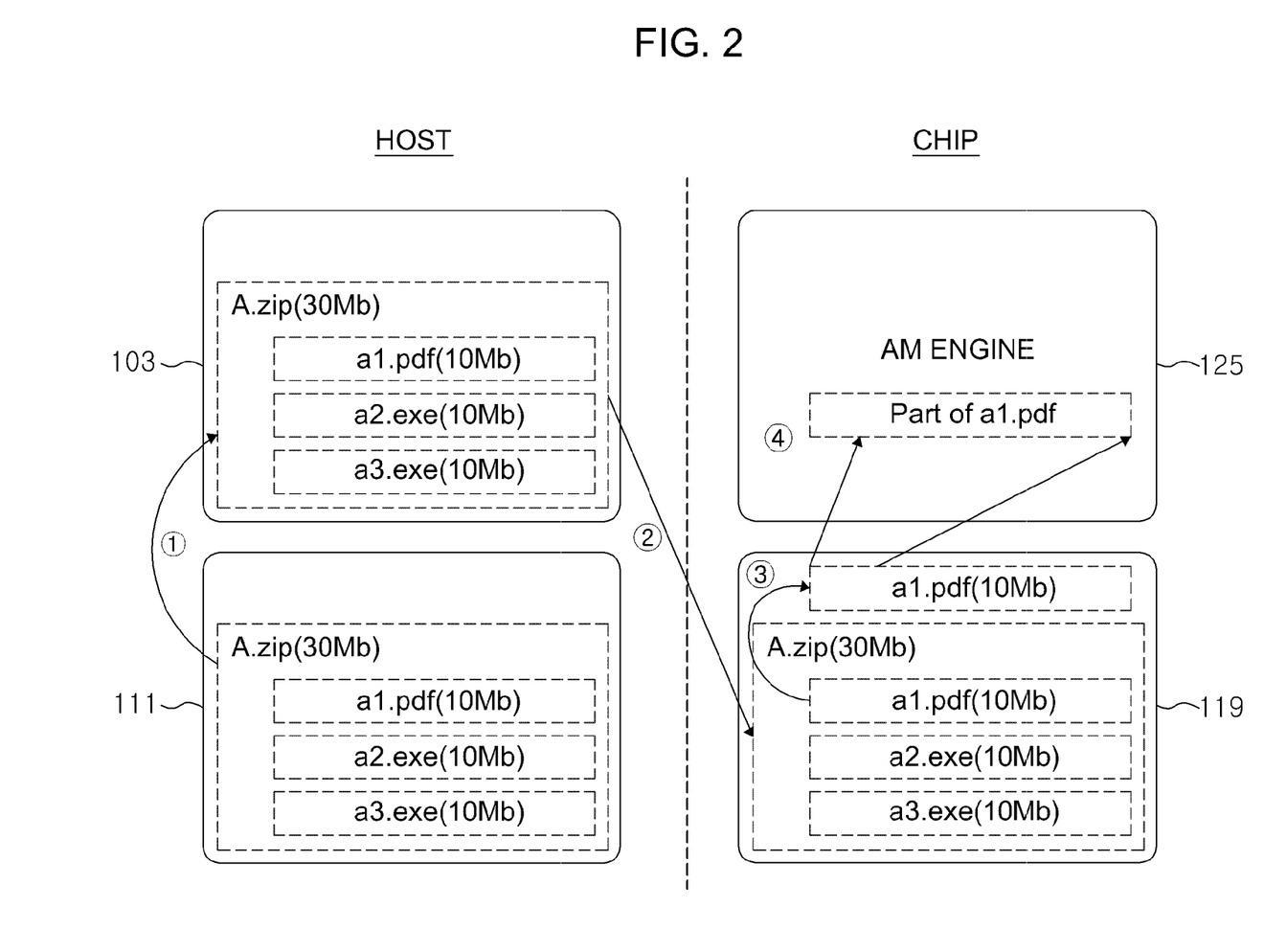
FIG. 2 is a view to explain an anti-malware scanning system according to an exemplary embodiment.

FIG. 2 is a view to explain an anti-malware scanning system according to an exemplary embodiment.

Referring to FIGS. 1 and 2, the AM application 105 may instruct to scan upon receiving a command to scan from a user or according to a predetermined scanning schedule. The AM application 105 compares a size of a file to be scanned and a storage capacity of the chip 120 (at least one of a storage capacity of the CHIP memory 117 and the storage unit 119). If the size of the file to be scanned is smaller than the storage capacity of the chip 120, the file to be scanned stored in the storage unit 111 is loaded into the MAIN memory 103 (①). The case that the size of the file to be scanned is larger than the storage capacity of the chip 120 will be explained below with reference to FIGS. 4, 6, and 8. In the present exemplary embodiment, the case that the size of the file to be scanned is smaller than the storage capacity of the chip 120 will be explained.

The AM application 105 transmits the file to be scanned, which is loaded into the MAIN memory 103, to the input/output interface unit 123 through the AM driver 109 (②).

The file to be scanned, which is received through the input/output interface unit 123, is stored in the storage unit 119. If the file to be scanned is a compressed file, the file is decompressed and is then stored in the storage unit 119 (③). An element to decompress the file may be a predetermined program (not shown) stored in the storage unit 119. In this case, the program may be loaded into the CHIP memory 117 and may be operated to decompress the file. The AM engine 125 loads a part of the file to be scanned, which is stored in the storage unit 119, into the CHIP memory 117 and performs a scanning operation (④). If the scanning operation is completed, the AM engine 125 transmits a result of scanning to the AM application 105 through the input/output interface unit 123. The AM application 105 may notify the result of scanning to the user through a screen, though it is understood that another exemplary embodiment is not limited thereto. For example, according to one or more other exemplary embodiments, the AM application 105 may notify the result of scanning to the user through an email, a message, etc.

The elements shown in FIG. 1 but not shown in FIG. 2 are not shown for the convenience of explanation and should be considered as being included in the exemplary embodiment of FIG. 2. For the same reason, the elements are omitted from the descriptions of exemplary embodiments presented below.

Figure 3:
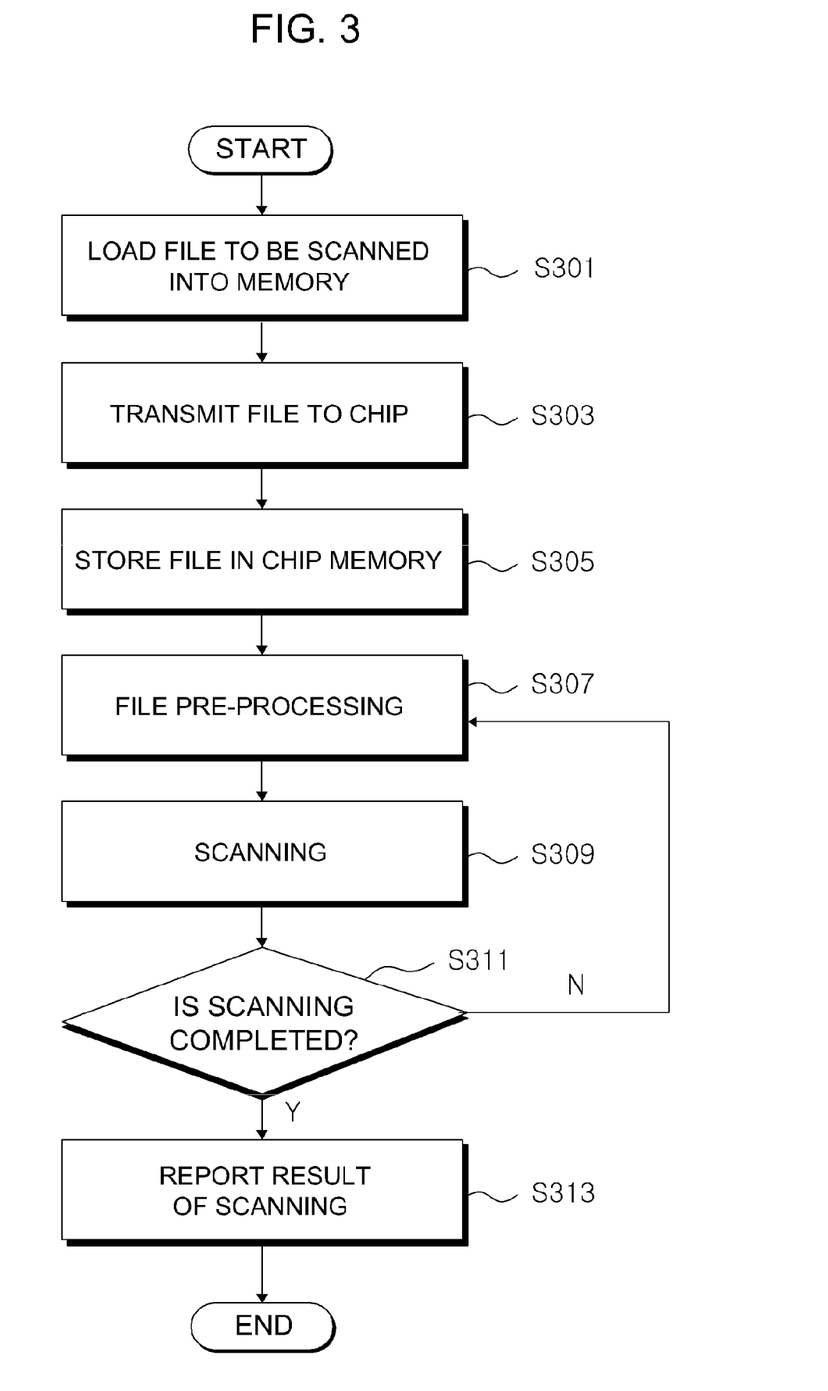
FIG. 3 is a view to explain an anti-malware scanning method according to an exemplary embodiment.

FIG. 3 is a view to explain an anti-malware scanning method according to an exemplary embodiment.

Referring to FIGS. 1 and 3, in an anti-malware scanning method according to an exemplary embodiment, the host 100 loads a file to be scanned into the MAIN memory 103 according a command to scan or a predetermined scanning schedule (operation S301), and transmits the loaded file to the chip 120 (operation S303).

The chip 120 stores the file to be scanned in the CHIP memory 117 (operation S305) and performs a file pre-processing operation (operation S307). The file pre-processing operation includes an operation of at least one of identifying a type of file and decompressing the file if the file is a compressed file.

If the file pre-processing operation is completed, the chip 120 compares the file to be scanned and the signature data 113 and 121 stored in the storage unit 119 or the storage unit 111 and performs a scanning operation to determine whether malware exists in the file (operation S309).

The scanning operation is performed with respect to the entire file, which is transmitted from the host 100 (operation S311: N), and, if the scanning operation is completed (operation S311: Y), the chip 120 notifies a result of scanning to the host 100 (operation S313).

In the present exemplary embodiment, the chip 120 stores the file to be scanned in the CHIP memory 117 upon receiving the file in operation S305. However, the chip 120 may store the file to be scanned, which is transmitted from the host 100, in the storage unit 119 rather than the CHIP memory 117, if a size of the file to be scanned is larger than a storage capacity of the CHIP memory 117.

Figure 4:
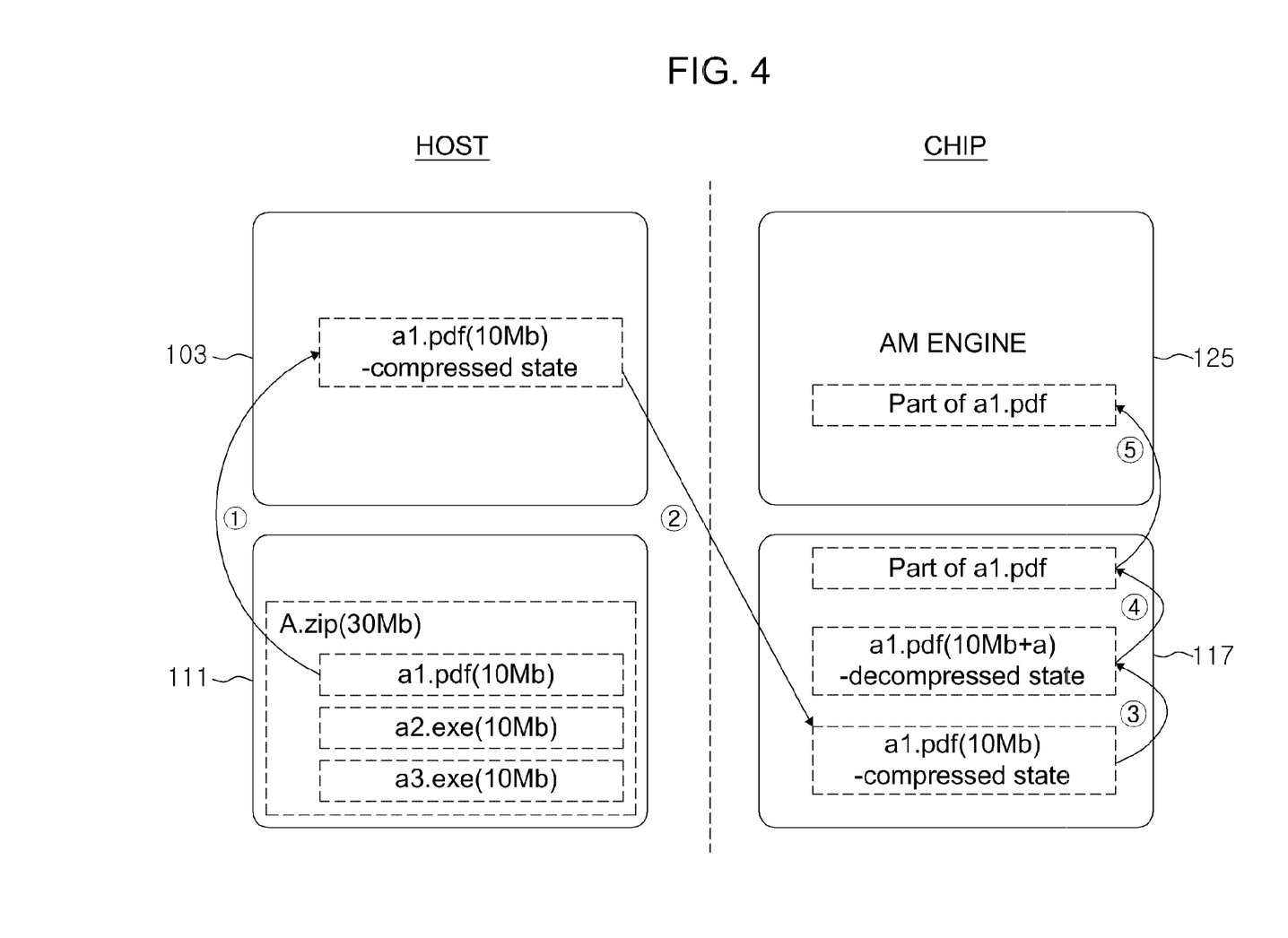
FIG. 4 is a view to explain an anti-malware scanning system according to another exemplary embodiment.

FIG. 4 is a view to explain an anti-malware scanning system according to another exemplary embodiment.

Referring to FIGS. 1 and 4, the AM application 105 may perform a scanning operation upon receiving a command to scan from a user or according to a predetermined scanning schedule. The AM application 105 compares a size of a file to be scanned and a storage capacity of the chip 120 (a storage capacity of at least one of the CHIP memory 117 and the storage unit 119). If the size of the file to be scanned is smaller than the storage capacity of the chip 120, the scanning operation may be performed according to the exemplary embodiment described above with reference to FIG. 2.

The present exemplary embodiment will be explained with the assumption that the file to be scanned is a compressed file and the size of the file to be scanned is greater than or equal to the storage capacity of the chip 120.

The AM application 105 loads a part of the file to be scanned into the MAIN memory 103 (①) and transmits the loaded file to the input/output interface unit 123 through the AM driver 109 (②). The part of the file is one of a plurality of files of a compressed file and the part of the file itself may be a compressed file (for example, a1.pdf(10 Mb)-compressed state).

The file to be scanned, which is received through the input/output interface unit 123, is stored in the CHIP memory 117, and, if the file to be scanned is a compressed file, the file is decompressed and is than stored in the CHIP memory 117 (③). The operation of decompressing the file may be the same as or similar to the decompressing operation described above with reference to FIG. 2. Also, a part of the decompressed file (for example, a part of a1.pdf, a1.pdf(10 Mb+a)-decompressed state) may be stored in the CHIP memory 117.

The AM engine 125 performs a scanning operation with respect to the part of the file stored in the CHIP memory 117 (⑤). Subsequent operations may be the same as or similar to those described above with reference to FIG. 2.

Figure 5:
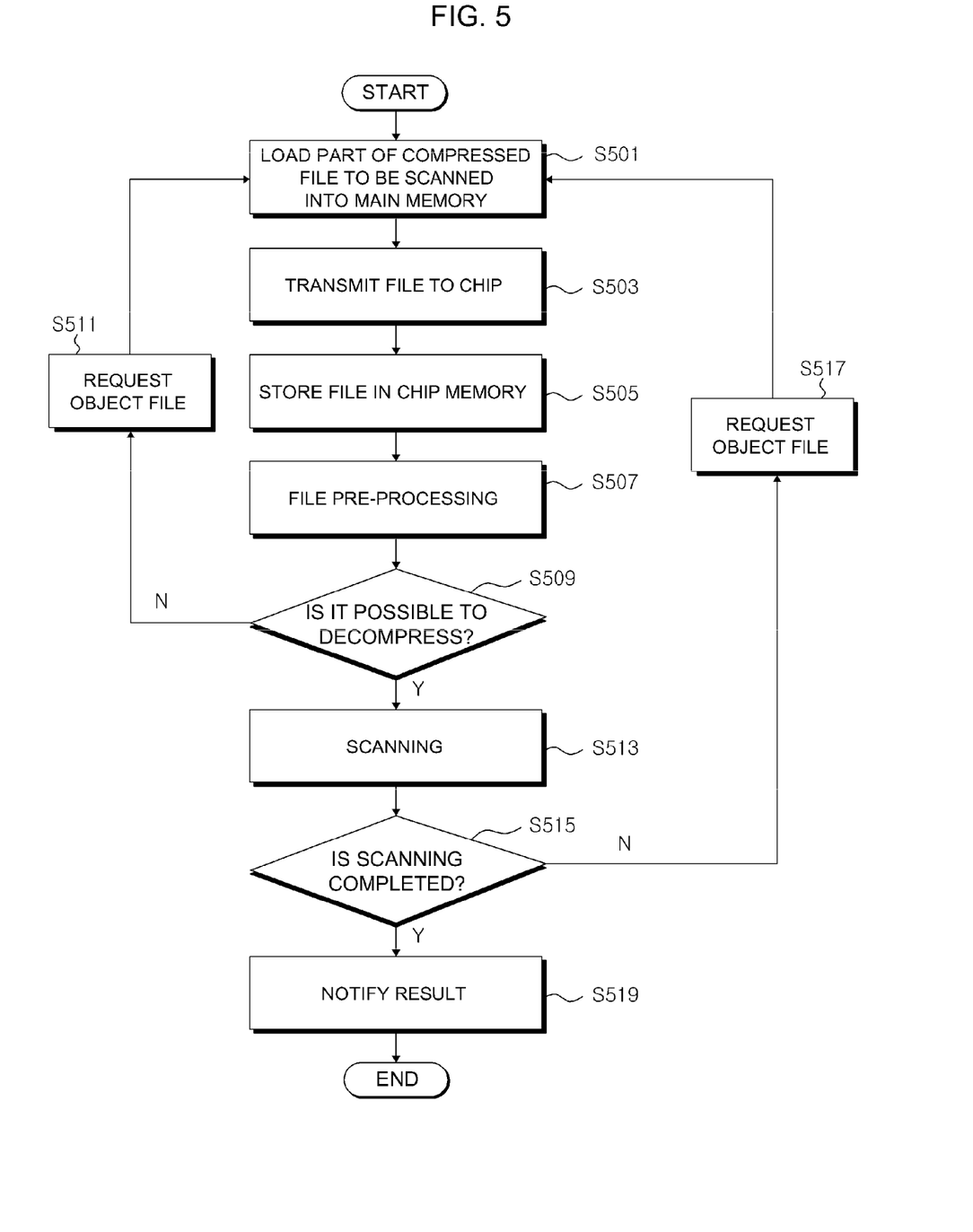
FIG. 5 is a view to explain an anti-malware scanning method according to another exemplary embodiment.

FIG. 5 is a view to explain an anti-malware scanning method according to another exemplary embodiment.

FIGS. 1 and 5 will be referred to and the present exemplary embodiment will be explained with the assumption that a file to be scanned is a compressed file. The host 100 loads a part of a file to be scanned, which is compressed, into the MAIN memory 103 of the host 100 according to a user's command to scan or a predetermined scanning schedule (operation S501), and transmits the loaded file to the chip 120 (operation S503).

The chip 120 stores the file to be scanned in the CHIP memory 117 (operation S505) and performs a file pre-processing operation (operation S507). The file pre-processing operation includes at least one of an operation of identifying a type of file (e.g., whether the file is a compressed file or whether the file can be decompressed in part) and an operation of decompressing the file to be scanned if the file is a compressed file. If additional data is used to decompress the file, as a result of the file pre-processing (operation S509: N), the additional data to decompress the file (that is, an object file) is requested (operation S511).

If the additional data is not used in decompressing the file (operation S509: Y), a scanning operation is performed (operation S513). For example, the chip 120 performs the scanning operation to determine whether malware exists in the file by comparing the signature data 113 and 121 stored in the storage unit 119 or the storage unit 111 and the file to be scanned (operation S513).

The scanning operation is performed with respect to the entire file transmitted from the host 100 (operation S515: N, operation S517), and, if the scanning operation is completed (operation S515: Y), the chip 120 notifies a result of scanning to the host 100 (operation S519).

Although the chip 120 stores the file to be scanned in the CHIP memory 117 upon receiving the file in operation S505, the chip 120 may store the file to be scanned in the storage unit 119 rather than the CHIP memory 117 if the size of the file to be scanned, which is transmitted from the host 100, is larger than or equal to a storage capacity of the CHIP memory 117.

Figure 6:
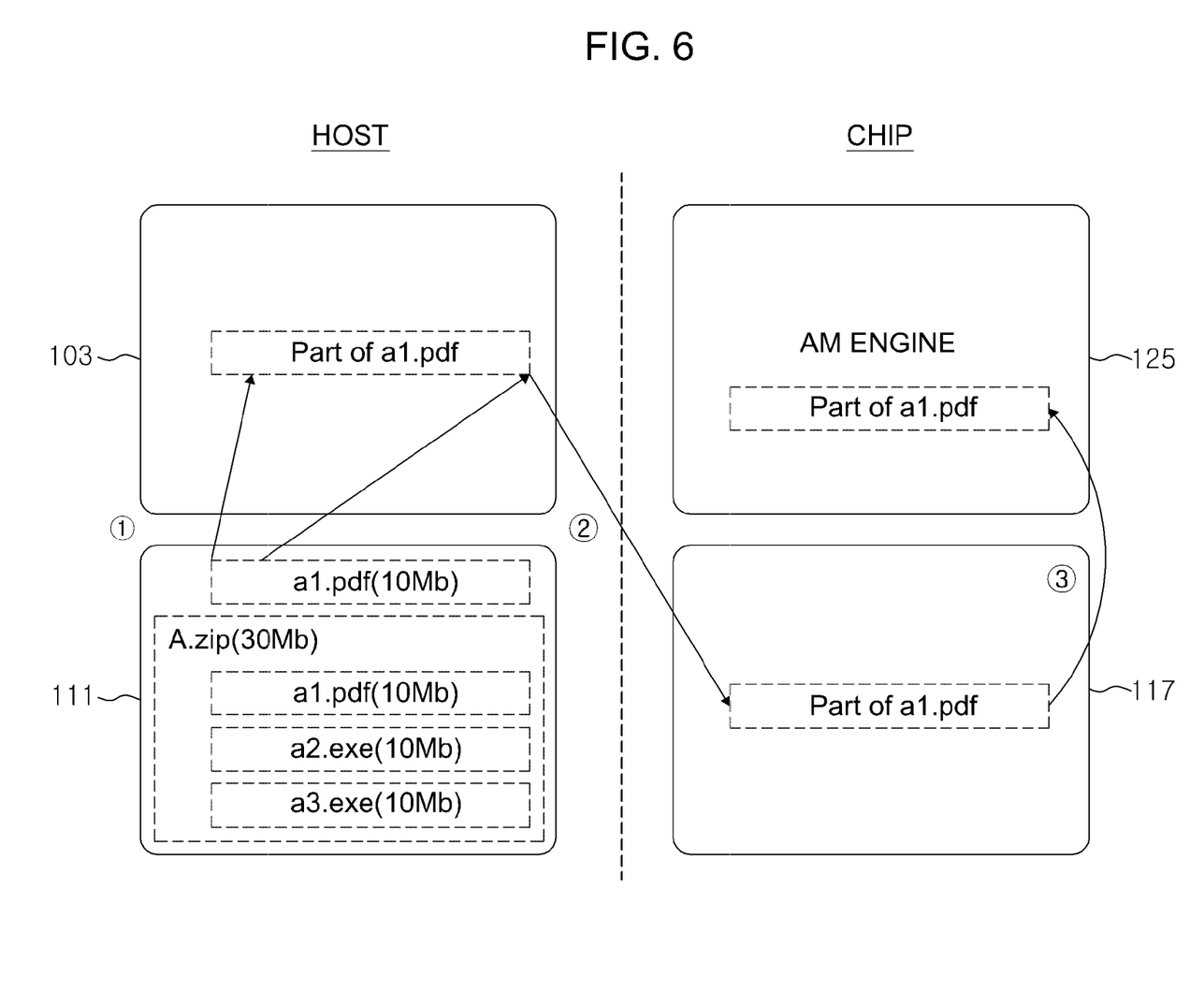
FIG. 6 is a view to explain an anti-malware scanning system according to still another exemplary embodiment.

FIG. 6 is a view to explain an anti-malware scanning system according to still another exemplary embodiment.

Referring to FIGS. 1 and 6, the AM application 105 may perform a scanning operation upon receiving a command to scan from a user or according to a predetermined scanning schedule. The AM application 105 compares a size of a file to be scanned and a storage capacity of the chip 120 (a storage capacity of at least one of the CHIP memory 117 and the storage unit 119). If the size of the file to be scanned is smaller than the storage capacity of the chip 120, the scanning operation is performed according to scanning operation described above with reference to FIG. 2.

The present exemplary embodiment will be explained with the assumption that the file to be scanned is a compressed file and the size of the file to be scanned is larger than or equal to the storage capacity of the chip 120.

The AM application 105 loads a part of the file to be scanned into the MAIN memory 103 (①) and transmits the loaded file to the input/output interface unit 123 through the AM driver 109 (②). The part of the file to be scanned is one of a plurality of files of a compressed file (for example, a part of a1.pdf(10 Mb)).

The file to be scanned, which is received through the input/output interface unit 123, is stored in the CHIP memory 117.

The AM engine 125 performs a scanning operation with respect to the part of the file (a part of a1.pdf) stored in the CHIP memory 117 (③). Subsequent operations may be the same as in the embodiment of FIG. 2.

Figure 7:
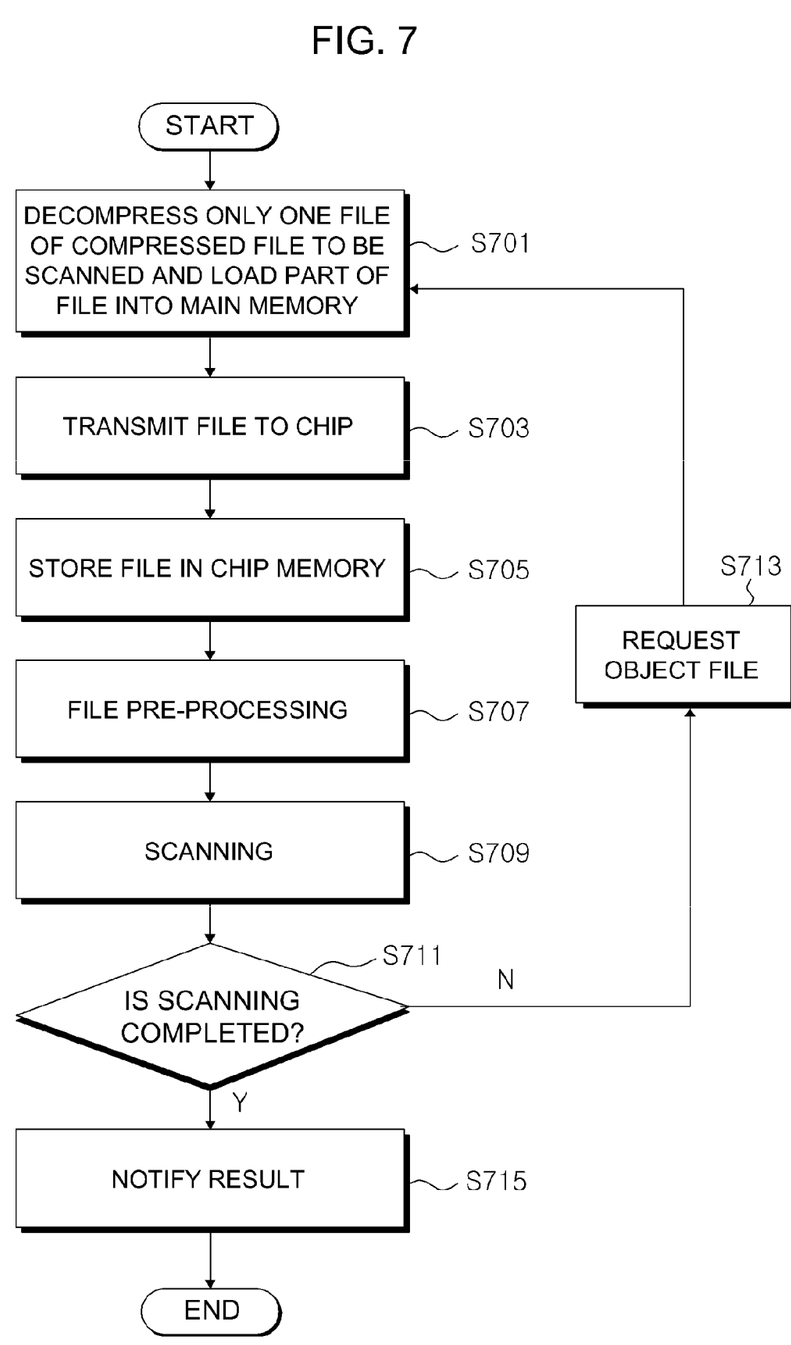
FIG. 7 is a view to explain an anti-malware scanning method according to still another exemplary embodiment.

FIG. 7 is a view to explain an anti-malware scanning method according to another exemplary embodiment.

FIGS. 1 and 7 will be referred to and the present exemplary embodiment will be explained with the assumption that a file to be scanned is a compressed file. The host 100 decompresses only one file of the file to be scanned according to a user's command to scan or a predetermined scanning schedule, loads the decompressed file into the MAIN memory 103 (operation S701), and transmits the loaded file to the chip 120 (operation S703).

The chip 120 stores the file to be scanned in the CHIP memory 117 (operation S705) and performs a file pre-processing operation (operation S707). The file pre-processing operation may include an operation of identifying a type of file.

If the file pre-processing operation is completed, the chip 120 performs a scanning operation to determine whether malware exists in the file by comparing the signature data 113 and 121 stored in the storage unit 119 or the storage unit 111 and the file to be scanned (operation S709).

The scanning operation is performed with respect to the entire file to be scanned, which is transmitted from the chip 120 (operation S711: N, operation S713), and, if the scanning operation is completed (operation S711: Y), the chip 120 notifies a result of scanning to the host 100 (operation S715).

Although the chip 120 stores the file to be scanned in the CHIP memory 117 upon receiving the file in operation S705, the chip 120 may store the file to be scanned in the storage unit 119 rather than the CHIP memory 117 if a size of the file transmitted from the host 100 is larger than a storage capacity of the CHIP memory 117.

Figure 8:
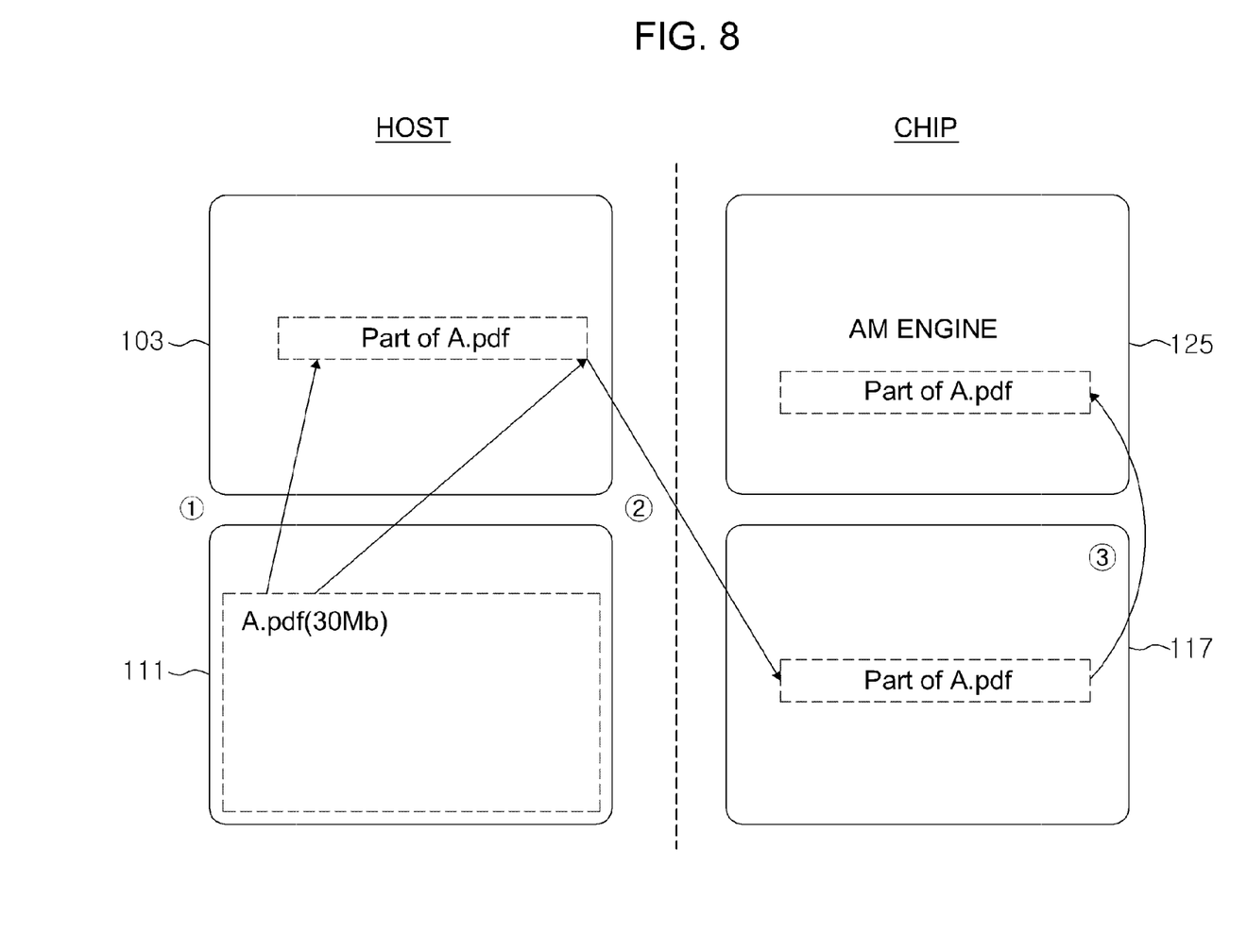
FIG. 8 is a view to explain an anti-malware scanning system according to still another exemplary embodiment.

FIG. 8 is a view to explain an anti-malware scanning system according to still another exemplary embodiment.

Referring to FIGS. 1 and 8, the AM application 105 may perform a scanning operation upon receiving a command to scan from a user or according to a predetermined scanning schedule. The AM application 105 compares a size of a file to be scanned and a storage capacity of the chip 120 (a storage capacity of at least one of the CHIP memory 117 and the storage unit 119). If the size of the file to be scanned is smaller than the storage capacity of the chip 120, the scanning operation may be performed as described above with reference to FIG. 2.

The present exemplary embodiment will be explained with the assumption that the file to be scanned is a uncompressed file and the size of the file to be scanned is larger than or equal to the storage capacity of the chip 120.

The AM application 105 loads a part of the file to be scanned (a part of A.pdf) into the MAIN memory 103 (①) and transmits the loaded file to the input/output interface unit 123 through the AM driver 109 (②). The part of the file to be scanned may be one of a plurality of files of a uncompressed file (for example, a part of A.pdf).

The file to be scanned, which is received through the input/output interface unit 123, is stored in the CHIP memory 117.

The AM engine 125 performs a scanning operation with respect to the part of the file (for example, a part of A.pdf) stored in the CHIP memory 117 (③). Subsequent operations may be the same as or similar to those described above with reference to FIG. 2.

Figure 9:
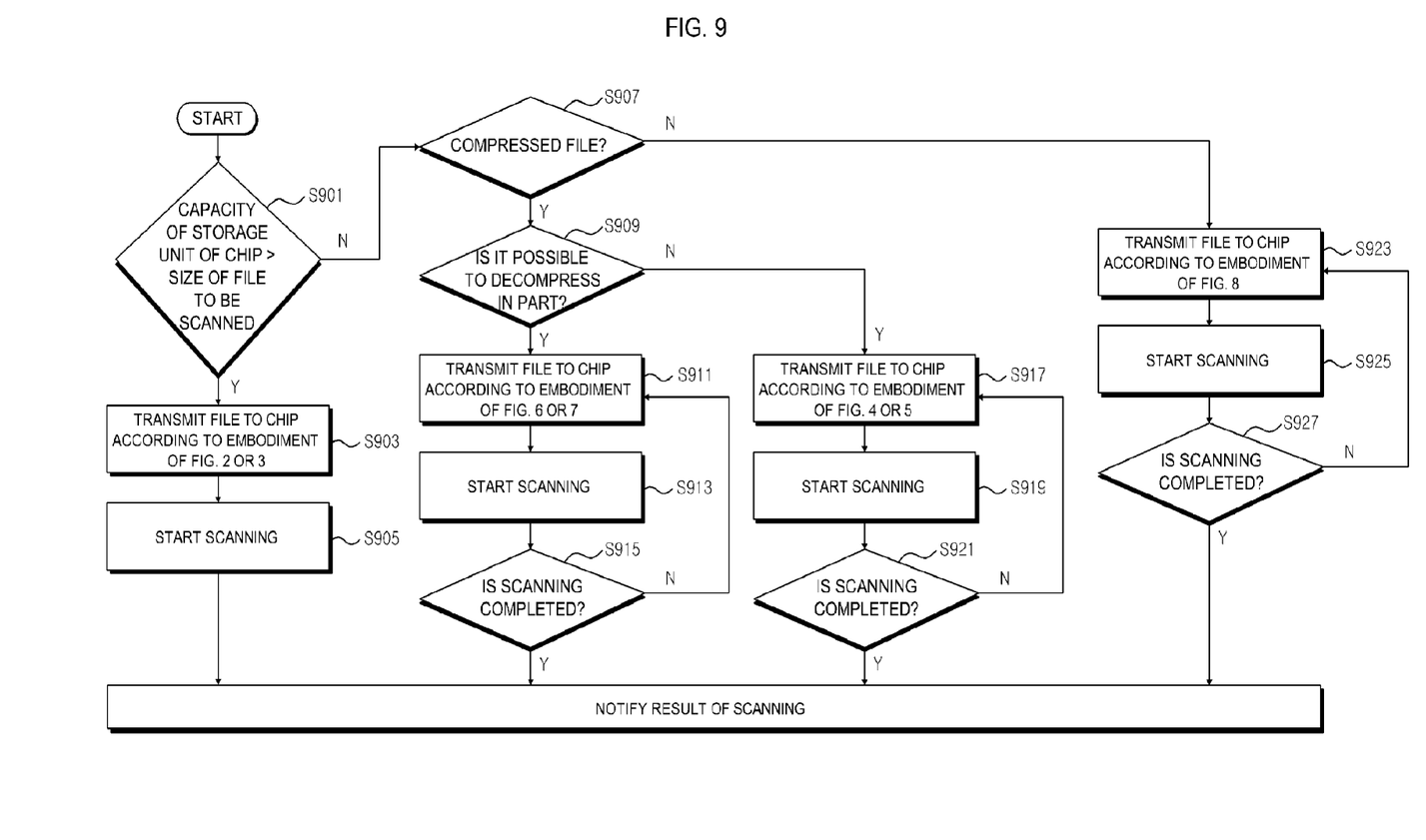
FIG. 9 is a view to explain an anti-malware scanning method according to still another exemplary embodiment.

FIG. 9 is a view to explain an anti-malware scanning method according to still another exemplary embodiment.

Referring to FIGS. 1 and 9, the host 100 may start a scanning operation according to a user's command to scan or a predetermined scanning schedule. The host 100 compares a size of a file to be scanned and a storage capacity of the storage unit of the chip 120 (a storage capacity of at least one of the CHIP memory 117 and the storage unit 119) (operation S901).

If the storage capacity of the storage unit of the chip 120 (at least one of the CHIP memory 117 and the storage unit 119) is larger than the size of the file to be scanned (operation S901:Y), the file to be scanned is transmitted to the chip 120 and the scanning operation is performed (operation S905) as described above with reference to FIG. 2 or 3.

On the other hand, if the storage capacity of the storage unit of the chip 120 (at least one of the CHIP memory 117 and the storage unit 119) is smaller than or equal to the size of the file to be scanned (operation S901: N), it is determined whether the file to be scanned is a compressed file (operation S907).

If it is determined that the file to be scanned is a compressed file (operation S907:Y), the host 100 determines whether it is possible to decompress file in part (operation S909). If it is possible to decompress the file in part (operation S909:Y), the file to be scanned is transmitted to the chip 120 as described above with reference to FIG. 6 or 7 (operation S911), and the scanning operation is performed (operation S913). The scanning operation may be performed with respect to the entire file transmitted from the host 100 until the scanning operation is completed (operation S915: N).

If it is impossible to decompress the file in part (operation S909: N), the file to be scanned is transmitted to the chip 120 as described above with reference to FIG. 4 or 5 (operation S917) and the scanning operation is performed (operation S919). The scanning operation may be performed with respect to the entire file transmitted from the host 100 until the scanning operation is completed (operation S921: N).

If the file to be scanned is not a compressed file (operation S907: N), the file to be scanned is transmitted to the chip 120 as described above with reference to FIG. 8 (operation S923) and the scanning operation is performed (operation S925). The scanning operation is performed with respect to the entire file transmitted from the host 100 until the scanning operation is completed (operation S927: N).

If the above-described scanning operations are completed, the chip 120 notifies a result of scanning to the host 100.

The anti-malware scanning system according to the above-described exemplary embodiments may include various hardware and/or software resources in addition to the above-described elements. The resources include hardware resources and software resources necessary for the operation of the anti-malware scanning system, and the hardware resources may be a CPU or memory and the software resources may be an operating system (OS), for example. For example, a UI application or a web browser may be operated on the OS and may be loaded into a memory under control of the CPU to be operated. Thus, interaction with the hardware resources and/or the software resources necessary for operating or executing a certain application would be a technology that an ordinary skilled person in the related art could understand easily and this technology is combined as a part of the exemplary embodiments of the present disclosure without departing from the spirit of the present disclosure. Also, it should be understood that, when the elements included in the anti-malware scanning system are operated, the elements may interact with the hardware resources and/or the software resources even if these resources are not mentioned explicitly or allusively.

The anti-malware scanning system may include the hardware resources and/or the software resources directly, but, alternatively, the anti-malware scanning system may use at least some of the hardware resources and/or the software resources using a network (for example, a software as a service (SaaS) or a web hard).

Methods according to exemplary embodiments may be realized in the form of a program command that can be performed various computer means and may be recorded on a computer readable medium. The computer readable medium may store a program command, a data file, and a data structure independently or a combination thereof. The program command recorded on the medium may be designed and configured to achieve the exemplary embodiments or may be known to the ordinary skilled person in the computer software field.

The anti-malware scanning system according to exemplary embodiments may be realized in the form of a program code that is transmitted through a transmitting medium such as electric wire or cable or an optical fiber or through any other form and may be embodied by communication. The transmitting medium corresponds to exemplary embodiments of the present disclosure.

According to exemplary embodiments, scanning can be effectively performed even in an environment in which resources of the anti-malware scanning system are limited.

Also, the scanning can be effectively performed even in an environment in which both resources of the anti-malware system realized in the form of a chip and resources of the host connected to the chip are limited.

While exemplary embodiments have been particularly shown and described above, it will be understood by those of ordinary skill in the art that various changes in form and details may be made therein without departing from the spirit and scope of the present invention as defined by the following claims.

What is claimed is:

1. An anti-malware scanning system comprising:
   a host; and
   a chip which is removably connected to the host, receives a file to be scanned from the host, and scans whether malware exists in the received file,
   wherein, if a size of the file to be scanned is larger than a storage capacity of a storage unit of the chip, the host adjusts the size of the file to be scanned according to the storage capacity of the storage unit of the chip and transmits the adjusted file to the chip, and
   wherein the host adjusts the size of the file to be scanned to a size determined by the chip.

2. The anti-malware scanning system as claimed in claim 1, wherein:
   the storage unit comprises a volatile storage unit and a non-volatile storage unit; and
   if the received file to be scanned is smaller than a capacity of the volatile storage unit, the chip stores the received file to be scanned in the volatile storage unit, and, if the received file to be scanned is larger than the capacity of the volatile storage unit, the chip stores the received file to be scanned in the non-volatile storage unit.

3. The anti-malware scanning system as claimed in claim 2, wherein, if the received file to be scanned is a compressed file, the chip stores the received file to be scanned in the volatile storage unit if a size of the received file after decompression is smaller than the capacity of the volatile storage unit, and stores the received file to be scanned in the non-volatile storage unit if the size of the received file after decompression is larger than the capacity of the volatile storage unit.

4. The anti-malware scanning system as claimed in claim 1, wherein:
   the storage unit comprises a volatile storage unit;
   the host transmits a part of the file to be scanned to the chip; and
   the host or the chip determines a size of the part of the file to be smaller than a capacity of the volatile storage unit.

5. The anti-malware scanning system as claimed in claim 4, wherein the file to be scanned is a compressed file.

6. A method for scanning whether malware exists in a file of a host, the method comprising:
   transmitting the file to be scanned to a chip which is removably connected to the host; and
   scanning, by the chip, the transmitted file for malware,
   wherein the transmitting comprises, if a size of the file to be scanned is larger than a storage capacity of a storage unit of the chip, transmitting a part of the file to be scanned to the chip,
   wherein the storage unit comprises a volatile storage unit, and
   wherein a size of the part of the file to be scanned is smaller than a capacity of the volatile storage unit.

7. The method as claimed in claim 6, wherein:
   the storage unit comprises a volatile storage unit and a non-volatile storage unit; and
   the scanning comprises:
   if the size of the file to be scanned is smaller than a capacity of the volatile storage unit, storing the transmitted file to be scanned in the volatile memory, and, if the size of the file to be scanned is larger than the capacity of the volatile storage unit, storing the transmitted file to be scanned in the non-volatile storage unit, and
   scanning by comparing the part of the file stored in the volatile storage unit or the non-volatile storage unit and signature data in sequence.

8. The method as claimed in claim 6, further comprising:
   if the file to be scanned is a compressed file, determining whether the file is decompressable in part; and
   if the file is decompressable in part, decompressing the file in part,
   wherein the transmitting further comprises transmitting a part of the file decompressed in part to the chip.

9. The method as claimed in claim 8, wherein the transmitting further comprises, if the file is not decompressable in part, decompressing an entirety of the file and transmitting a part of the decompressed entire file.

10. The method as claimed in claim 6, further comprising comparing the size of the file to be scanned and the storage capacity of the storage unit of the chip.

11. A method for scanning whether malware exists in a file of a host, the method comprising:
    transmitting the file to be scanned to a chip which is removably connected to the host; and
    receiving a result of malware scanning from the chip,
    wherein the transmitting comprises, if a size of the file to be scanned is larger than a storage capacity of a storage unit of the chip, transmitting a part of the file to be scanned to the chip,
    wherein the storage unit comprises a volatile storage unit, and
    wherein a size of the part of the file to be scanned is smaller than a capacity of the volatile storage unit.

12. The method as claimed in claim 11, further comprising:
    if the file to be scanned is a compressed file, determining whether the file is decompressable in part; and
    if the file is decompressable in part, decompressing the file in part,
    wherein the transmitting further comprises transmitting a part of the file decompressed in part to the chip.

13. The method as claimed in claim 12, wherein the transmitting further comprises, if the file is not decompressable in part, decompressing an entirety of the file and transmitting a part of the decompressed entire file.

14. A method for scanning whether malware exists in a file of a host, the method comprising:
    receiving, by a chip which is removably connected to the host, the file to be scanned from the host; and
    scanning, by the chip, the received file for malware,
    wherein the receiving comprises, if a size of the file to be scanned is larger than a storage capacity of a storage unit of the chip, receiving a part of the file to be scanned,
    wherein the storage unit comprises a volatile storage unit, and
    wherein a size of the part of the file to be scanned is smaller than a capacity of the volatile storage unit.

15. A non-transitory computer readable recording medium having recorded thereon a program executable by a computer for performing the method of claim 6.

16. A non-transitory computer readable recording medium having recorded thereon a program executable by a computer for performing the method of claim 11.

17. A non-transitory computer readable recording medium having recorded thereon a program executable by a computer for performing the method of claim 14.

18. The anti-malware scanning system as claimed in claim 1, wherein the chip transmits a result of the scan to the host.

* * * * *